Dec. 1, 1953  R. F. E. STEGEMAN  2,660,924
SPECTACLE WITH VERTICALLY ADJUSTABLE LENSES
Filed Feb. 17, 1950
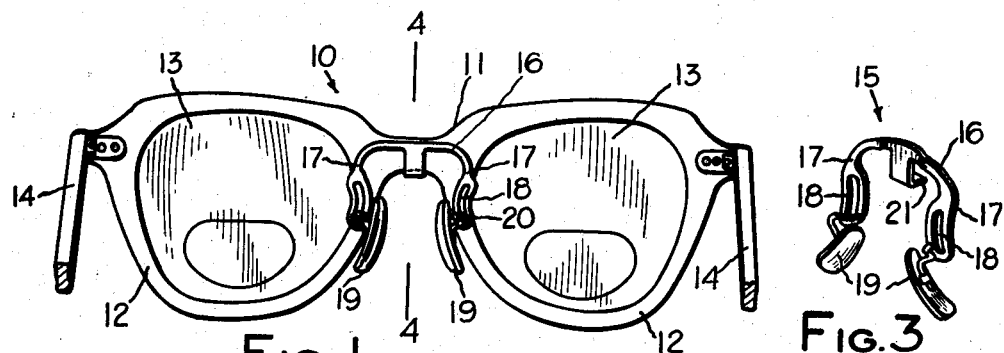
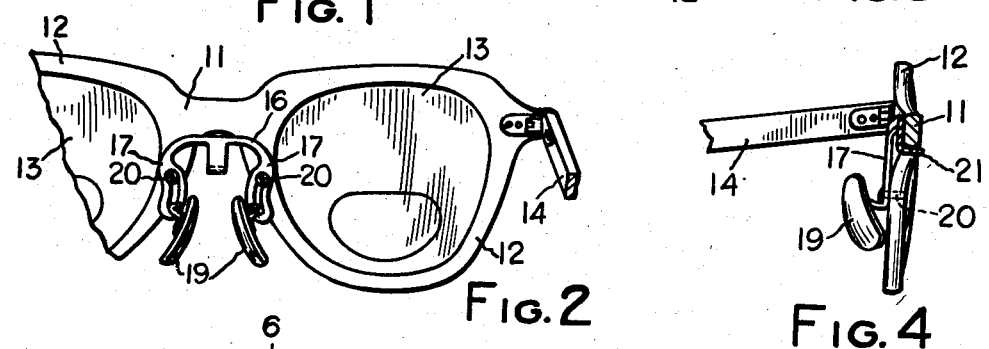
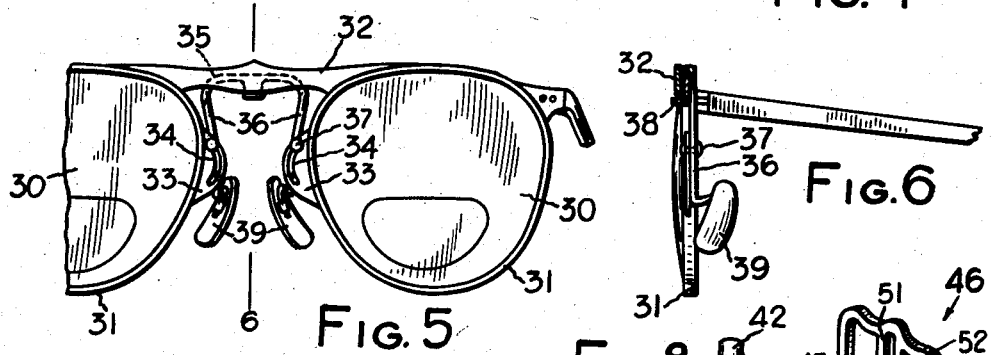
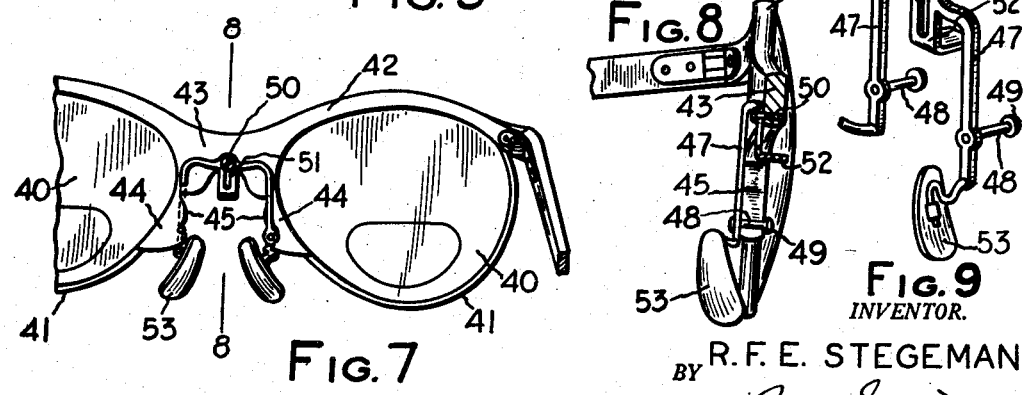
INVENTOR.
BY R. F. E. STEGEMAN
ATTORNEY Patented Dec. 1, 1953

2,660,924

UNITED STATES PATENT OFFICE 2,660,924

SPECTACLE WITH VERTICALLY ADJUSTABLE LENSES

Raymond F. E. Stegeman, Greece, N. Y., assignor to Bausch & Lomb Optical Company, Rochester, N. Y., a corporation of New York Application February 17, 1950, Serial No. 144,819

6 Claims. (Cl. 88—49)

This invention relates to spectacles and more particularly it has reference to spectacles which include vertically adjustable multifocal lenses having portions for distance vision and portions for reading vision. In order to provide greater comfort and convenience to the wearer while reading, it is desirable to have the lenses vertically adjustable so as to selectively position the reading portions of the lenses more directly in front of the eyes.

One of the objects of my invention is to provide a spectacle of the type described which will be relatively simple in structure, efficient in operation and neat in appearance. Another object is to provide an auxiliary bridge which may be readily attached to existing types of spectacle frames so that the lenses and the frame may be vertically adjusted relative to the bridge. These and other objects and advantages reside in certain novel features of construction, arrangement and combination of parts as will hereinafter be more fully described and pointed out in the appended claims.

Referring to the drawings:

Fig. 1 is a rear view of a spectacle embodying my invention.

Fig. 2 is a similar view showing the lenses in raised position relative to the auxiliary bridge.

Fig. 3 is a perspective view of the auxiliary bridge.

Fig. 4 is a sectional view taken on line 4—4 of Fig. 1.

Fig. 5 is a front view of a spectacle embodying a modification of my invention.

Fig. 6 is a sectional view taken on line 6—6 of Fig. 5.

Fig. 7 is a rear view of a spectacle embodying another modification of the invention with part of the auxiliary bridge broken away.

Fig. 8 is a sectional view taken on line 8—8 of Fig. 7.

Fig. 9 is a perspective view of the auxiliary bridge embodied in the device of Fig. 7.

A preferred embodiment of my invention is shown in the drawings wherein 10 indicates a well-known type of non-metallic spectacle frame comprising the bridge portion 11 connecting the lens rims 12 which carry the multifocal lenses 13. The usual temples 14 are hingedly supported on the frame.

Slidably mounted on the rear face of the frame 10 is the auxiliary bridge 15 having the top portion 16 connecting the two depending side portions 17 which are provided, respectively, with the vertically positioned arcuate slots 18. The nose pads 19 are rockably mounted on arms secured to the lower ends of side portions 17. Secured respectively to the nasal portions of rims 12, and projecting rearwardly therefrom through the slots 18, are the pins or screws 20 which have enlarged heads so that the slotted sides 17 are retained thereon.

The auxiliary bridge 15 is formed so that the slots 18 in the side portions 17 are in yieldable engagement with the pins 20 so that the resilience of the parts will retain the pins 20 at the upper and lower ends of the arcuate slots 18 when the frame is raised relative to the auxiliary bridge. Preferably, the auxiliary bridge is integrally formed by stamping it out of sheet material having the proper characteristics. Secured to the top portion 16 is the projection 21 which extends downwardly, forwardly, and under the bridge portion 11, as shown in Fig. 4, so that it may be engaged by the finger from the front side of the frame when the lenses are vertically adjusted.

When the spectacle is worn in normal use, the frame and lenses are in the "down" position relative to the auxiliary bridge 15, as shown in Fig. 1. In this position, the parts of the auxiliary bridge 15 are concealed behind the bridge portion 11 and the nasal parts of rims 12, so that only the projection 21 will be visible from the front side of the spectacle. The pins 20 are held at the lower ends of the slots 18 by the resilience of the side portions 16.

With the spectacle thus being worn, if it is desired to raise the lenses in order to position the reading segments more directly before the eyes, the wearer merely holds a finger of one hand on projection 21 and with the other hand raises the lens rims and lenses until the pins 20 engage the upper limits of the slots 18 as shown in Fig. 2. In order to return the lenses to the normal position of Fig. 1, the wearer merely pushes downwardly on the upper parts of lens rims 12.

In Fig. 5 a modification of the invention is shown as applied to a metallic spectacle frame having the lenses 30 carried by eye wire rims 31 connected by a bridge 32. Secured to the nasal sides of the rims 31 are the members or plates 33 having the vertically positioned arcuate slots 34. An auxiliary bridge 35 having resilient sides 36 is slidably connected to the spectacle by means of headed pins 37 which are secured to the sides 36 and are in slidable engagement with the respective slots 34. The top portion of the auxiliary bridge has the projection 38 which extends forwardly and under the bridge 32 as shown in Fig. 6. The nose pads 39 are secured to the respective sides of the auxiliary bridge. It will be apparent that the spectacle shown in Fig. 5 will be used in the same manner as that shown in Fig. 1.

A further modification of the invention, shown in Fig. 7, comprises the spectacle having the lenses 40 carried in lens rims 41 which are connected by a non-metallic frame 42 having a bridge portion 43. Formed on the two inner edges of the nasal members 44 of the bridge portion are the vertically positioned arcuate tracks 45 having notches at the upper and lower ends of the tracks. The auxiliary bridge 46 has resilient sides 47 to which are secured, respectively, the pins 48 having enlarged heads 49. The space between the heads 49 and the sides 47 is such that the pins will ride along the arcuate tracks 45 and be urged against the tracks by the resilience of the sides 47. The auxiliary bridge is slidably secured to the bridge portion 43 by means of the headed pin or screw 50 which cooperates with slot 51 formed in the projection 52 on the top portion of the auxiliary bridge 46. The projection 52 has a finger-engaging portion extending forwardly under the bridge 43 as shown in Fig. 8. The nose pads 53 are secured to the lower ends of the sides 47.

When the parts are adjusted as shown in Fig. 7, the lenses are in the elevated or reading position. When the spectacle is worn with the parts in this position, it is only necessary to press down on the top of frame 42 in order to move the frame and lenses downward to the position of normal use.

From the foregoing it will be apparent that I am able to attain the objects of my invention and provide an improved multifocal spectacle which enables the lenses to be vertically adjusted to selectively position the different portions of the lenses before the eyes. My devices are relatively simple in structure yet capable of efficient and convenient operation. The form shown in Figs. 1 and 2 can be readily attached to non-metallic spectacle frames which are in common use. When attached to a frame, the auxiliary bridge is almost entirely concealed by the parts of the frame so a highly desired cosmetic effect is obtained. In attaching this auxiliary bridge to a non-metallic frame, the usual non-metallic pads which are attached to the lens rims would, of course, be first removed. The use of the vertically disposed arcuate tracks together with the laterally yieldable, resilient sides on the auxiliary bridge insure a smoothly operating device with positive stops at the upper and lower ends of the tracks. It is also to be pointed out that the vertical adjustments of the lenses relative to the auxiliary bridge can be easily and conveniently effected while the spectacles are being worn.

Various modifications can obviously be made without departing from the spirit of my invention as pointed out in the appended claims.

I claim:

1. In a spectacle having a bridge connecting a pair of multifocal lenses and a vertically adjustable auxiliary bridge carrying nose pads, the combination of a pair of members on the respective sides of the auxiliary bridge and a pair of coacting members fixedly mounted at the respective nasal edges of the lenses, one of said pairs of members having vertically positioned arcuate tracks which are curved in a vertical direction, the other pair of members comprising a pair of pins which slidably engage the respective tracks, the sides of said auxiliary bridge being resilient whereby the pins are releasably held at the upper or lower ends of the tracks when the lenses are raised or lowered relative to the auxiliary bridge to selectively position reading portions of the lenses before the eyes.

2. In a multifocal spectacle having a bridge connecting a pair of rims carrying lenses and an auxiliary bridge vertically adjustable on the frame of the spectacle and carrying nose pads, the combination of a pair of members on the respective sides of the auxiliary bridge, and a pair of coacting members fixedly carried by the respective nasal portions of the lens rims, one pair of members having vertically extending arcuate slots, the other pair of members comprising a pair of pins which extend through and are slidably engaged within the respective slots, the sides of the auxiliary bridge being resilient whereby the pins are releasably engaged with the upper or lower ends of the slots when the lens rims are raised or lowered relative to the auxiliary bridge to selectively position different portions of the lenses before the eyes.

3. A multifocal spectacle comprising a pair of spaced lens holding devices carrying multifocal lenses, a bridge connecting said devices, a pair of pins secured to and projecting rearwardly from the nasal portions of the respective devices, an auxiliary bridge having resilient sides provided, respectively, with vertically extending arcuate slots, said pins projecting through the slots whereby the auxiliary bridge is slidably connected to the rear side of the spectacle, and nose pads carried by the respective sides of the auxiliary bridge whereby the lenses may be vertically adjusted relative to the auxiliary bridge to selectively position different portions of the lenses before the eyes of the wearer, the resilience of the sides releasably holding the pins in the ends of the slots whereby the lenses will be held in adjusted position.

4. In a spectacle having a pair of lens rims connected by a bridge, the combination of an auxiliary bridge having two resilient sides connected by a top portion, a nose pad secured to each side, each of said sides having a vertically extending arcuate slot, a pair of pins projecting rearwardly from the nasal portions of the respective lens rims and extending through the respective slots in said auxiliary bridge whereby the latter is slidably connected to the rear of the spectacle, the resilience of the sides releasably holding the pins at the upper or lower ends of the slots when the lens rims are selectively positioned at upper or lower positions relative to the auxiliary bridge.

5. The structure recited in claim 4 wherein the top portion has a forwardly projecting member adapted to be engaged by the finger for moving the lenses relative to the auxiliary bridge, and the auxiliary bridge is integrally formed of resilient sheet material and retained on the spectacle by enlarged heads on the pins.

6. In a spectacle of the type described having a pair of lenses mounted in lens rims connected by a bridge and a vertically adjustable auxiliary bridge carrying nose pads, the combination of a pair of members lying substantially in the plane of the lenses and secured, respectively, to the nasal sides of the lens rims, each of said members having a vertically extending arcuate slot, and a pair of pins secured respectively to the sides of the auxiliary bridge and extending through the respective slots whereby the lens rims are slidably mounted with respect to the auxiliary bridge, the sides of the auxiliary bridge being resilient whereby the pins are releasably held at the upper or lower ends of the slots when the lenses are selectively positioned in upper or lower position before the eyes of a wearer.

RAYMOND F. E. STEGEMAN.

References Cited in the file of this patent

UNITED STATES PATENTS

| Number | Name | Date |
|---|---|---|
| Re. 20,732 | Yoe | May 17, 1938 |
| 2,121,336 | Bricker | June 21, 1938 |
| 2,148,397 | Bock | Feb. 21, 1939 |
| 2,184,417 | Ellestad | Dec. 26, 1939 |
| 2,277,726 | Splaine | Mar. 31, 1942 |

FOREIGN PATENTS

| Number | Country | Date |
|---|---|---|
| 427,831 | Great Britain | May 1, 1935 |
| 509,979 | Great Britain | July 25, 1939 |